(12) United States Patent
Ben-Yehuda et al.

(10) Patent No.: US 8,135,898 B2
(45) Date of Patent: Mar. 13, 2012

(54) MEMORY MANAGEMENT IN A NESTED VIRTUALIZATION ENVIRONMENT

(75) Inventors: Shmuel Ben-Yehuda, Haifa (IL); Abel Gordon, Haifa (IL); Anthony Nicholas Liguori, Haifa (IL); Orit Luba Wasserman, Haifa (IL); Ben-Ami Yassour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 12/609,092

(22) Filed: Oct. 30, 2009

(65) Prior Publication Data

US 2011/0107008 A1    May 5, 2011

(51) Int. Cl.
*G06F 12/00*    (2006.01)
(52) U.S. Cl. .......................................... 711/6
(58) Field of Classification Search ................ None
See application file for complete search history.

(56) References Cited

U.S. PATENT DOCUMENTS

| | | | |
|---|---|---|---|
| 7,299,337 B2 | 11/2007 | Traut et al. | |
| 7,370,137 B2* | 5/2008 | Regnier | 711/6 |
| 7,490,216 B1 | 2/2009 | Chen et al. | |
| 7,721,299 B2* | 5/2010 | van Riel | 719/319 |
| 7,734,892 B1* | 6/2010 | Rozas et al. | 711/208 |
| 2007/0016755 A1 | 1/2007 | Pratt | |

OTHER PUBLICATIONS

Paul Barham, "Xen and the Art of Virtualization", University of Cambridge Computer Laboratory 15 JJ Thomson Avenue, Cambridge, UK, CB3 0FD, 2003.

\* cited by examiner

*Primary Examiner* — Hiep Nguyen
(74) *Attorney, Agent, or Firm* — Jason Far-Hadian (57) ABSTRACT

A method for managing memory in a nested virtualization environment is provided. The method comprises implementing a first virtual machine (VM) for a first software such that a first guest memory is allocated to the first software; maintaining a first data structure to translate one or more memory addresses in the first guest memory to corresponding memory addresses in a physical memory; maintaining a second data structure to translate one or more memory addresses in the second guest memory to corresponding memory addresses in the physical memory. The first software implements a second VM for a second software such that a second guest memory is allocated to the second software and maintains a third data structure to translate one or more memory addresses in the second guest memory to corresponding memory addresses in the first guest memory.

24 Claims, 5 Drawing Sheets

MEMORY MANAGEMENT IN A NESTED VIRTUALIZATION ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to nested virtualization and, more particularly, to memory management in a nested virtualization environment.

BACKGROUND

In a virtualization environment, a host software (i.e., a hypervisor) running on one or more hardware infrastructures may emulate or virtualize the hardware for guest software running on the host software. In other words, a hypervisor running on a physical machine may virtualize the physical machine for guest software running on the hypervisor by implementing a virtual machine (VM) for the guest software.

Typically, the physical machine operates in a guest mode or a root mode. In the guest mode, the guest software manages execution of instructions by the physical machine. In the root mode, the hypervisor manages execution of instructions by the physical machine. The physical machine generally operates in the guest mode, but may switch to the root mode to execute a privileged instruction that requires support from the hypervisor to be compatible with the physical machine. Switching to the root mode is referred to as a VM exit, and switching back to the guest mode is referred to as a VM entry.

SUMMARY

The present disclosure is directed to systems and corresponding methods that facilitate memory management in a nested virtualization environment.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for managing memory in a nested virtualization environment is provided. The method comprises implementing a first virtual machine (VM) for a first software such that a first guest memory is allocated to the first software; maintaining a first data structure to translate one or more memory addresses in the first guest memory to corresponding memory addresses in a physical memory; maintaining a second data structure to translate one or more memory addresses in the second guest memory to corresponding memory addresses in the physical memory. The first software implements a second VM for a second software such that a second guest memory is allocated to the second software and maintains a third data structure to translate one or more memory addresses in the second guest memory to corresponding memory addresses in the first guest memory.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

A hypervisor may allocate memory to guest software running on the hypervisor. In a nested virtualization environment, the guest memory may be virtual memory or physical memory, depending on the level of virtualization being implemented by the hypervisor. Virtual memory refers to an abstraction that provides the guest software with the impression that the guest software has contiguous working memory although the memory may be physically fragmented. Thus, a guest memory address may need to be translated to a corresponding physical memory address to perform a memory access operation, as provided in further detail below.

Figure 1:
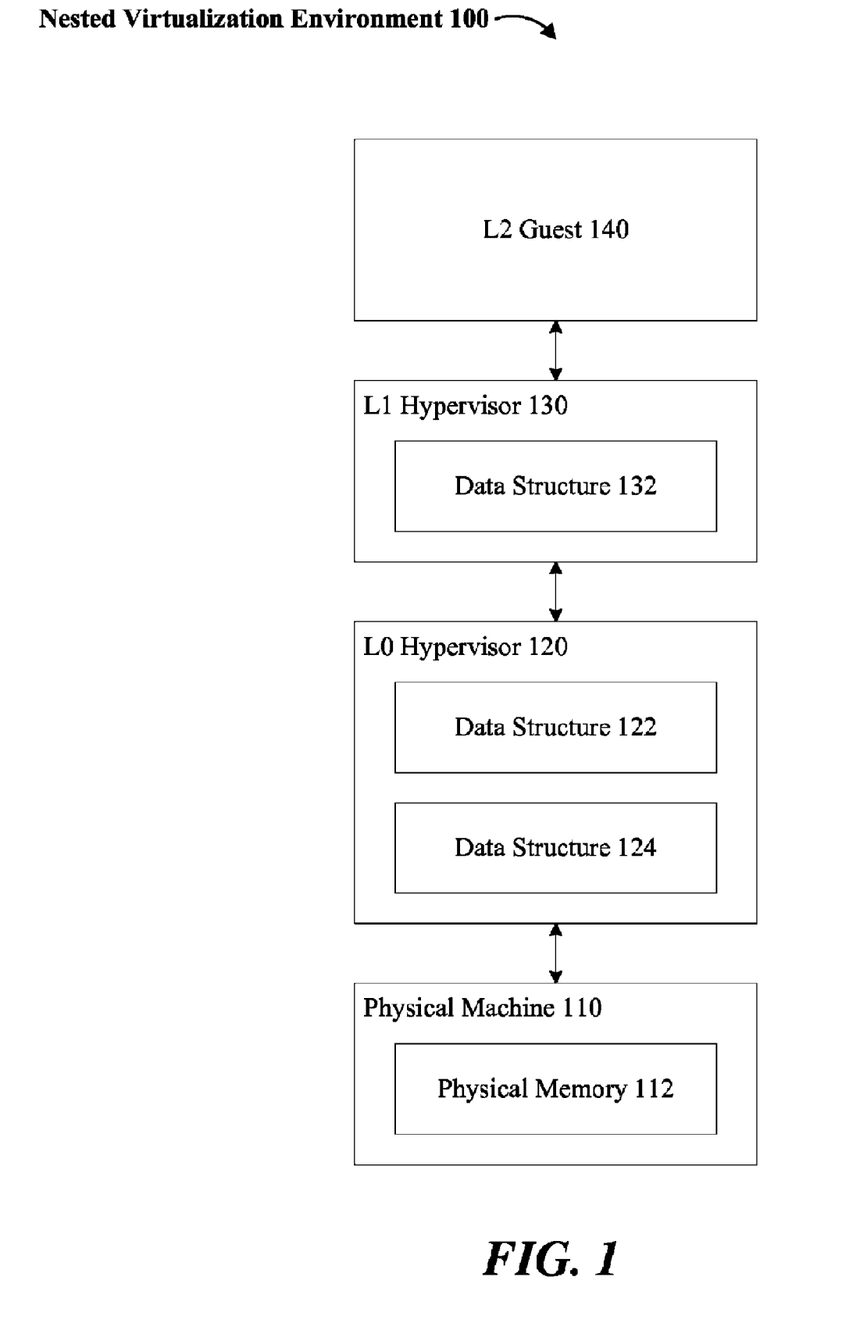
FIG. 1 illustrates an exemplary nested virtualization environment, in accordance with one or more embodiments.

Referring to FIG. 1, in accordance with one or more embodiments, an exemplary nested virtualization environment 100 comprises a physical machine 110, which includes a physical memory 112; a level 0 (L0) hypervisor 120; a level 1 (L1) hypervisor 130; and a level 2 (L2) guest software 140. The L0 hypervisor 120, also referred to as a root hypervisor, may implement a first level of virtualization (i.e., an L1 VM) for the L1 hypervisor 130. The L1 hypervisor 130, also referred to as a nested hypervisor, may implement a second level of virtualization (i.e., an L2 VM) for the L2 guest software 140.

The L0 hypervisor 120 may allocate memory to the L1 hypervisor 130. Depending on implementation, the L0 hypervisor 120 may maintain a data structure 122 comprising one or more page tables or other mapping mechanisms for associating memory addresses in the L1 hypervisor 130's memory (i.e., L1 memory addresses) with corresponding memory addresses in the physical memory 112 (i.e., L0 memory addresses).

The L1 hypervisor 130 may allocate memory to the L2 guest software 140. Depending on implementation, the L1 hypervisor 130 may maintain a data structure 132 comprising one or more page tables or other mapping mechanisms for associating memory addresses in the L2 guest software's memory (i.e., L2 memory addresses) with corresponding L1 memory addresses.

In one embodiment, the L0 hypervisor 120 may maintain a data structure 124 comprising one or more extended page tables or other mapping mechanisms for associating L2 memory addresses with corresponding L0 memory addresses. Since each VM exit caused by the guest software 140 transfers control to the L0 hypervisor 120, the L0 hypervisor 120 may utilize mapping information stored in the data structure 124 to directly translate an L2 memory address to a corresponding L0 memory address.

In the embodiments provided below, direct translation of guest memory addresses to corresponding memory addresses is described as being managed by the L0 hypervisor 120. However, it should be understood that such translation may be managed by the physical machine 112 if there is sufficient hardware support. That is, the physical machine 110 may maintain the data structure 124 and utilize mapping information stored in the data structure 124 to directly translate a guest memory address to a corresponding L0 memory address.

Figure 2A:
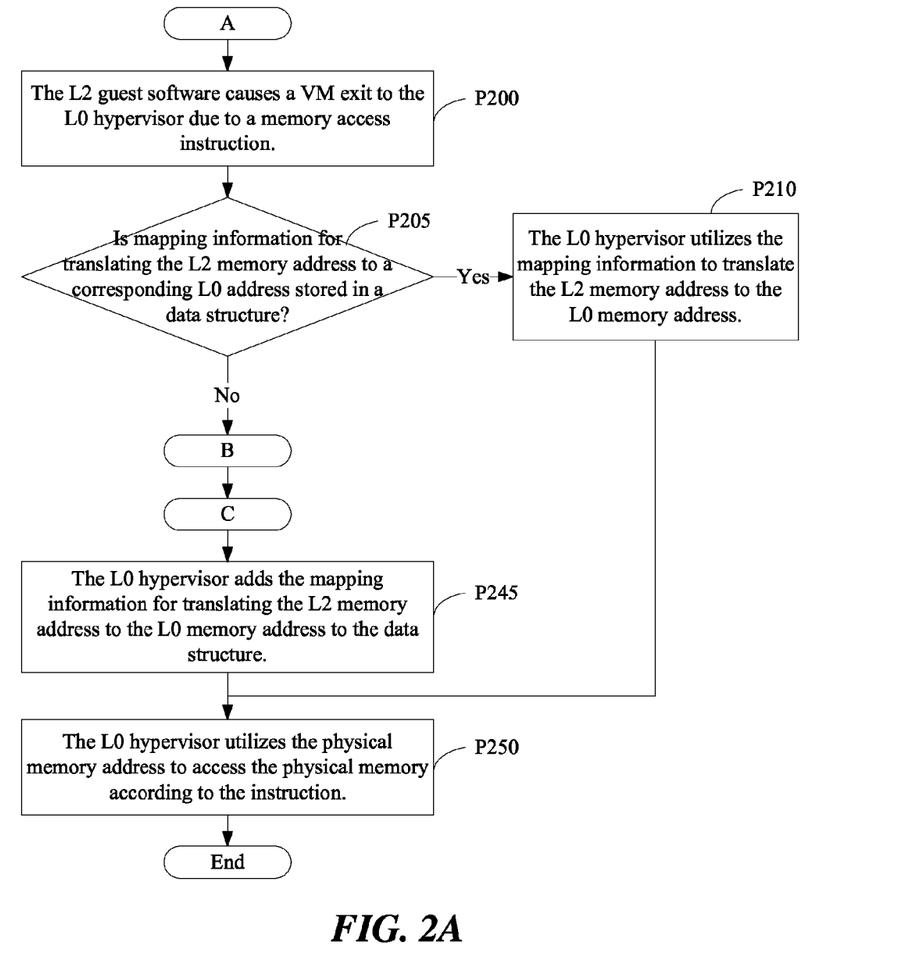
FIGS. 2A and 2B are flow diagrams of a method for managing memory in a nested virtualization environment, in accordance with one embodiment.
Figure 2B:
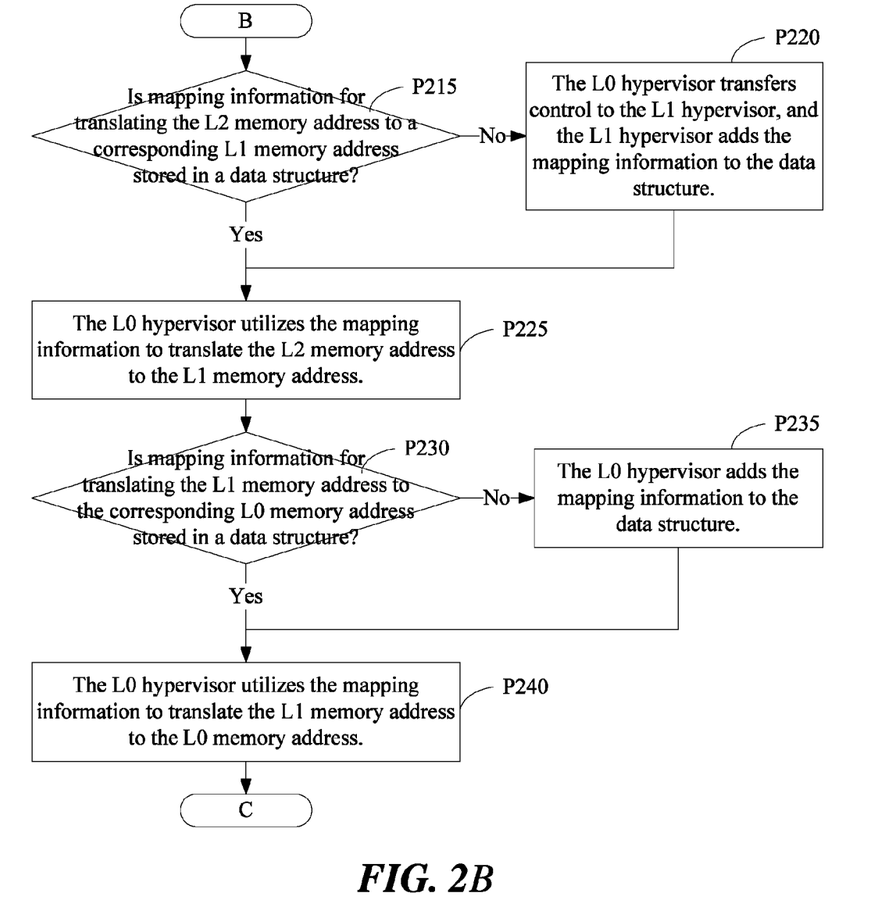

Referring to FIGS. 1, 2A, and 2B, in accordance with one embodiment, the L2 guest software 140 may cause a VM exit to the L0 hypervisor 120 due to a memory access instruction (P200). In response to the VM exit, the L0 hypervisor 120 determines whether mapping information for translating the L2 memory address referenced by the instruction to a corresponding L0 memory address is stored in the data structure 124 (P205).

If the mapping information is stored in the data structure 124, the L0 hypervisor 120 utilizes the mapping information to translate the L2 memory address to the L0 address and utilizes the L0 memory address to access the physical memory 112 according to the instruction (P210, P250). If the mapping information for translating the L2 memory address to the L0 memory address is missing from the data structure 124, the L0 hypervisor 120 determines whether mapping information for translating the L2 memory address to a corresponding L1 memory address is stored in the data structure 132 (P215).

If the mapping information for translating the L2 memory address to the L1 memory address is missing from the data structure 132, the L0 hypervisor 120 transfers control to the L1 hypervisor 130, and the L1 hypervisor 130 adds the mapping information to the data structure 132 (P220). It is noteworthy that the mapping information is available to the L1 hypervisor 130 because the L1 hypervisor 130 is the entity that allocated the L2 virtual memory to the L2 guest software 140.

Once the mapping information for translating the L2 memory address to the L1 memory address is stored in the data structure 132, the L0 hypervisor 120 utilizes the mapping information to translate the L2 memory address to the L1 memory address (P225). Upon translating the L2 memory address to the L1 memory address, the L0 hypervisor 120 determines whether mapping information for translating the L1 memory address to the corresponding L0 memory address is stored in the data structure 122 (P230).

If the mapping information for translating the L1 memory address to the L0 memory address is stored in the data structure 122, the L0 hypervisor 120 adds the mapping information to the data structure 122 (P235). It is noteworthy that the mapping information is available to the L0 hypervisor 120 because the L0 hypervisor 120 is the entity that allocated the L1 virtual memory to the L1 hypervisor 130.

Once the mapping information for translating the L1 memory address to the L0 memory address is stored in the data structure 122, the L0 hypervisor 120 utilizes the mapping information to translate the L1 memory address to the L0 memory address (P240). The L0 hypervisor 120 also adds the mapping information for translating the L2 memory address to the L0 memory address to the data structure 124 and utilizes the L0 memory address to access the physical memory 112 according to the instruction (P245, P250).

In alternative embodiments, the nested virtualization environment 100 may comprise multiply nested hypervisors. That is, there may be more than one nested hypervisor. In such embodiments, the systems and methods provided above may be extended to support memory management with multiply nested hypervisors, as provided in more detail below.

For example, the L0 hypervisor 120 may maintain a data structure for each hypervisor or guest software running directly or indirectly on the L0 hypervisor 120. The data structure may store information for translating a memory address in the guest memory allocated to the hypervisor or the guest software to a corresponding L0 memory address. Each nested hypervisor may maintain a data structure for each hypervisor or guest software running directly or indirectly on the nested hypervisor. The data structure may store information for translating a memory address in the guest memory allocated to the hypervisor or the guest software to a corresponding memory address in the memory of the nested hypervisor.

On a VM exit caused by a memory access instruction referencing a guest memory address, the L0 hypervisor 120 may utilize mapping information stored in the data structures to translate the guest memory address to a corresponding L0 memory address. Mapping information may be added to the data structures by the nested hypervisors, level by level. That is, the L0 hypervisor 120 may transfer control to the L1 hypervisor 130 so that the L1 hypervisor 130 may add missing information to a data structure. If the L1 hypervisor 130 is unable to add the missing information to a data structure, the L1 hypervisor 130 may transfer control to the next-level hypervisor so that the next-level hypervisor may add missing information to a data structure, and so on, until each data structure has the information required to translate the guest memory address to the L0 memory address.

In different embodiments, the claimed subject matter may be implemented either entirely in the form of hardware or entirely in the form of software, or a combination of both hardware and software elements. For example, the nested virtualization environment 100 may comprise a controlled computing system environment that may be presented largely in terms of hardware components and software code executed to perform processes that achieve the results contemplated by the system of the claimed subject matter.

Figure 3:
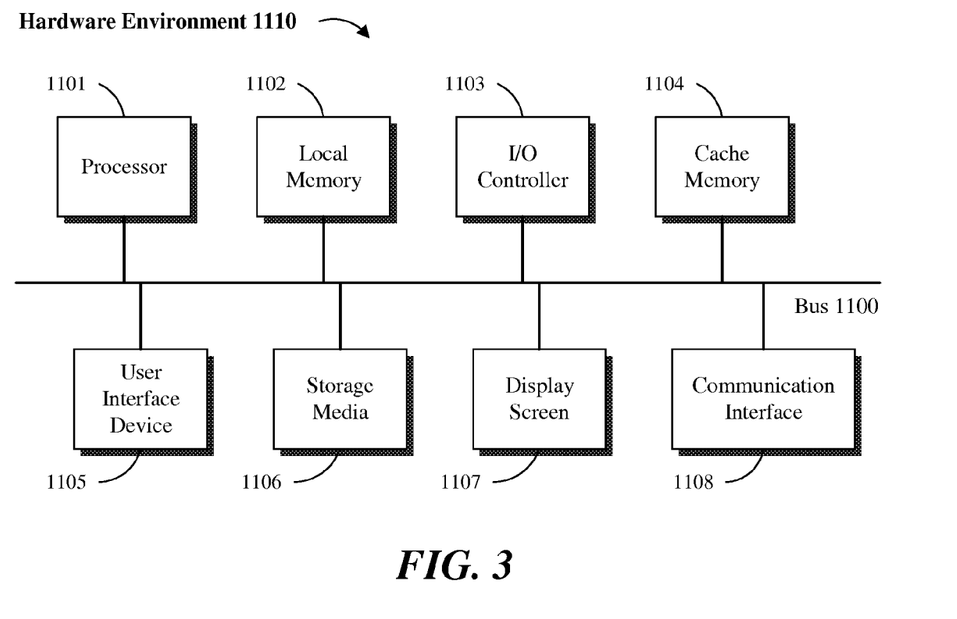
FIGS. 3 and 4 are block diagrams of hardware and software environments in which a system of the present invention may operate, in accordance with one or more embodiments.
Figure 4:
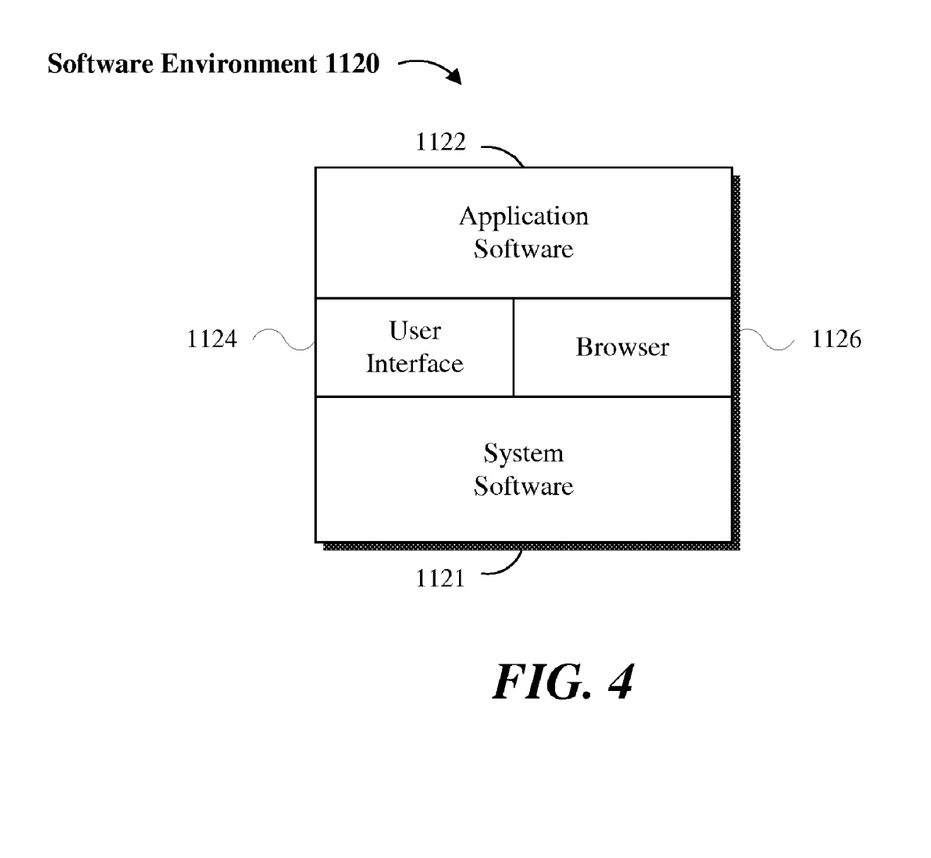

Referring to FIGS. 3 and 4, a computing system environment in accordance with an exemplary embodiment is composed of a hardware environment 1110 and a software environment 1120. The hardware environment 1110 comprises the machinery and equipment that provide an execution environment for the software; and the software environment 1120 provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, the L0 hypervisor 120 or the L1 hypervisor 130 may be implemented as system software 1121 or application software 1122 executed on one or more hardware environments to manage memory in a nested virtualization environment.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 3, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a personal computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A computer-implemented method for managing memory in a nested virtualization environment, the method comprising:
   implementing a first virtual machine (VM) for a first software such that a first guest memory is allocated to the first software;
   maintaining a first data structure to translate one or more memory addresses in the first guest memory to corresponding memory addresses in a physical memory;
   maintaining a second data structure to translate one or more memory addresses in a second guest memory to corresponding memory addresses in the physical memory;
   wherein the first software implements a second VM for a second software such that the second guest memory is allocated to the second software; and
   wherein the first software maintains a third data structure to translate one or more memory addresses in the second guest memory to corresponding memory addresses in the first guest memory.

2. The method of claim 1, further comprising determining whether first information for translating a first memory address in the second guest memory to a second memory address in the physical memory is stored in the second data structure, in response to the second software causing a VM exit due to a memory access instruction.

3. The method of claim 2, further comprising determining whether second information for translating the first memory address to a third memory address in the first guest memory is stored in the third data structure, in response to determining that the first information is missing from the second data structure.

4. The method of claim 3, wherein the first software adds the second information to the third data structure, in response to determining that the second information is missing from the third data structure.

5. The method of claim 4, further comprising utilizing the second information to translate the first memory address to the third memory address, in response to determining that the second information is stored in the third data structure.

6. The method of claim 5, further comprising determining whether third information for translating the third memory address to the second memory address is stored in the first data structure, in response to determining that the first information is missing from the second data structure.

7. The method of claim 6, further comprising adding the third information to the first data structure, in response to determining that the third information is missing from the first data structure.

8. The method of claim 7, further comprising utilizing the third information to translate the third memory address to the second memory address, in response to determining that the third information is stored in the first data structure.

9. The method of claim 8, further comprising adding the first information to the second data structure, in response to determining that the first information is missing from the second data structure.

10. The method of claim 9, further comprising utilizing the first information to translate the first memory address to the second memory address, in response to determining that the first information is stored in the second data structure.

11. A system for managing memory in a nested virtualization environment, the system comprising:
   a physical memory from which a first guest memory is allocated to a first virtual machine (VM) implemented for a first software,
   a logic unit for maintaining a first data structure to translate one or more memory addresses in the first guest memory to corresponding memory addresses in the physical memory;
   a logic unit for maintaining a second data structure to translate one or more memory addresses in a second guest memory to corresponding memory addresses in the physical memory;
   wherein the first software comprises a logic unit for implementing a second VM for a second software such that the second guest memory is allocated to the second software; and
   wherein the first software further comprises a logic unit for maintaining a third data structure to translate one or more memory addresses in the second guest memory to corresponding memory addresses in the first guest memory.

12. The method of claim 11, further comprising a logic unit for determining whether first information for translating a first memory address in the second guest memory to a second memory address in the physical memory is stored in the second data structure, in response to the second software causing a VM exit due to a memory access instruction.

13. The method of claim 12, further comprising a logic unit for determining whether second information for translating the first memory address to a third memory address in the first guest memory is stored in the third data structure, in response to determining that the first information is missing from the second data structure.

14. The method of claim 13, wherein the first software further comprises a logic unit for adding the second information to the third data structure, in response to determining that the second information is missing from the third data structure.

15. The method of claim 14, further comprising a logic unit for utilizing the second information to translate the first memory address to the third memory address, in response to determining that the second information is stored in the third data structure.

16. The method of claim 15, further comprising a logic unit for determining whether third information for translating the third memory address to the second memory address is stored in the first data structure, in response to determining that the first information is missing from the second data structure.

17. The method of claim 16, further comprising a logic unit for adding the third information to the first data structure, in response to determining that the third information is missing from the first data structure.

18. The method of claim 17, further comprising a logic unit for utilizing the third information to translate the third memory address to the second memory address, in response to determining that the third information is stored in the first data structure.

19. The method of claim 18, further comprising a logic unit for adding the first information to the second data structure, in response to determining that the first information is missing from the second data structure.

20. The method of claim 19, further comprising a logic unit for utilizing the first information to translate the first memory address to the second memory address, in response to determining that the first information is stored in the second data structure.

21. A computer program product comprising a computer readable medium having logic code stored thereon, wherein the logic code when executed on a computer causes the computer to:

implement a first virtual machine (VM) for a first software such that a first guest memory is allocated to the first software;

maintain a first data structure to translate one or more memory addresses in the first guest memory to corresponding memory addresses in a physical memory;

maintain a second data structure to translate one or more memory addresses in a second guest memory to corresponding memory addresses in the physical memory;

wherein the first software implements a second VM for a second software such that the second guest memory is allocated to the second software; and wherein the first software maintains a third data structure to translate one or more memory addresses in the second guest memory to corresponding memory addresses in the first guest memory.

22. The computer program product of claim 21, wherein the logic code when executed on a computer further causes the computer to determine whether first information for translating a first memory address in the second guest memory to a second memory address in the physical memory is stored in the second data structure, in response to the second software causing a VM exit due to a memory access instruction.

23. The computer program product of claim 22, wherein the logic code when executed on a computer further causes the computer to:

determine whether second information for translating the first memory address to a third memory address in the first guest memory is stored in the third data structure, in response to determining that the first information is missing from the second data structure;

wherein the first software adds the second information to the third data structure, in response to determining that the second information is missing from the third data structure; and utilize the second information to translate the first memory address to the third memory address, in response to determining that the second information is stored in the third data structure.

24. The computer program product of claim 23, wherein the logic code when executed on a computer further causes the computer to:

determine whether third information for translating the third memory address to the second memory address is stored in the first data structure, in response to determining that the first information is missing from the second data structure;

add the third information to the first data structure, in response to determining that the third information is missing from the first data structure;

utilize the third information to translate the third memory address to the second memory address, in response to determining that the third information is stored in the first data structure;

add the first information to the second data structure, in response to determining that the first information is missing from the second data structure; and utilize the first information to translate the first memory address to the second memory address, in response to determining that the first information is stored in the second data structure.

* * * * *